(12) United States Patent
Fukuo

(10) Patent No.: US 7,063,225 B2
(45) Date of Patent: Jun. 20, 2006

(54) OPENING-CLOSING MECHANISM AND OPENING-CLOSING DEVICE USING SAME

(75) Inventor: Michihiro Fukuo, Tokyo (JP)

(73) Assignee: Nifco Inc., Yokohama (JP)

( * ) Notice: Subject to any disclaimer, the term of this patent is extended or adjusted under 35 U.S.C. 154(b) by 619 days.

(21) Appl. No.: 10/268,950

(22) Filed: Oct. 11, 2002

(65) Prior Publication Data

US 2003/0080131 A1     May 1, 2003

(30) Foreign Application Priority Data

Oct. 29, 2001   (JP) .............................. 2001-330738

(51) Int. Cl.
    *B65D 43/26*     (2006.01)
(52) U.S. Cl. .................. 220/264; 220/827; 16/354
(58) Field of Classification Search ........... 220/264, 220/263, 827, 830, 835; 16/62, 64, 69–289, 16/356; 296/34.14, 34.12; B65D 43/14, B65D 43/16, 43/22, 43/24, 43/26
    See application file for complete search history.

(56) References Cited

U.S. PATENT DOCUMENTS

| | | | | |
|---|---|---|---|---|
| 491,154 A | * | 2/1893 | Wight | 16/64 |
| 1,129,712 A | * | 2/1915 | Neyer | 16/62 |
| 5,065,884 A | * | 11/1991 | Naritomi et al. | 220/264 |
| 5,752,757 A | * | 5/1998 | Choi | 312/319.1 |
| 5,893,478 A | * | 4/1999 | Maruoka | 16/354 |
| 6,334,542 B1 | * | 1/2002 | Hsu | 220/263 |
| 6,367,124 B1 | * | 4/2002 | Bella et al. | 292/336.3 |
| 6,609,631 B1 | * | 8/2003 | Asami | 220/817 |
| 6,662,405 B1 | * | 12/2003 | Vitry | 16/355 |
| 2003/0071047 A1 | * | 4/2003 | Harada | |

FOREIGN PATENT DOCUMENTS

| | | |
|---|---|---|
| JP | 62-6848 | 1/1987 |
| JP | 62-26145 | 2/1987 |
| JP | 9-86295 | 3/1997 |
| JP | 11-278514 | * 10/1999 |
| JP | 2002-178818 | 6/2002 |

* cited by examiner

*Primary Examiner*—Lien M. Ngo
(74) *Attorney, Agent, or Firm*—Manabu Kanesaka

(57) ABSTRACT

In an opening-closing mechanism of a door member for shifting the door member from a closed position for closing an opening portion of a base member to an open position and vice versa, the door member includes a pair of arm portions. Each arm portion includes a circular arc shape gear and a rotary gear disposed in a center of the circular arc of the gear. The base member includes a first fixed gear portion with internal teeth engaging the circular arc shape gear portion, and a second fixed gear portion disposed inside the first fixed gear engaging the rotary gear. The arm portion is held to move vertically through engagements between the first fixed gear portion and the circular arc shape gear portion and between the rotary gear and the second fixed gear portion, so that the door member is shifted along a path corresponding to the first fixed gear portion.

12 Claims, 9 Drawing Sheets

OPENING-CLOSING MECHANISM AND OPENING-CLOSING DEVICE USING SAME

BACKGROUND OF THE INVENTION AND RELATED ART STATEMENT

The invention relates to an opening-closing mechanism for opening and closing a door member with respect to a box-shape base member, and also relates to an opening-closing device using the same. Incidentally, in the specification, the "box-shape base member" widely includes various storage base portions and housings, and the "door member" widely includes a covering member, a shielding member and the like.

FIGS. 8(a), 8(b) and 9(a), 9(b) show two conventional opening-closing mechanisms of a door member, which belong to a type where the door member is rotated to shift among various opening-closing mechanisms of the door members. The opening-closing mechanism shown in FIG. 8(a) has a mechanism similar to, for example, the one disclosed in Japanese Patent Publication (TOKKAI) No. 09-20177. In the mechanism, a door member 42 is rotated by substantially 90 degree with respect to an opening portion of a box-shape base member 41 to be opened and closed. More specifically, a damper device 43 having a rotary gear 43a is disposed on a sidewall portion of the base member 41. The door member 42 includes arm portions 44 projecting from both sides thereof, and circular arc shape gears 44a provided to the arm portions 44 to engage the rotary gears 43a, so that the door member 42 is rotatably connected to the sidewall portion of the base member 41 through a pivot shaft 45, and is locked at a closed position shown by solid lines by a locking device, not shown. An urging spring 46 is provided between the arm portion 44 and the base member 41 so that the door member 42 is always urged toward an open position shown by a phantom line. In the mechanism, when the locking device is released through a pushing operation of the door member 42, the door member 42 is rotated toward the open position by the urging spring 46. When the door member 42 is rotated against the urging force of the urging spring 46, the door member 42 is held at the closed position by the locking device. The damper device 43 damps a rotating speed of the base member 41 through engagement between the rotary gear 43a and gear 44a.

Also, in an opening-closing mechanism as shown in FIGS. 9(a), 9(b), a door member 52 is rotated by substantially 90 degree with respect to an opening portion of a box-shape base member 51 to shift the door member 52 from a closed position shown in FIG. 9(a) to an open position (one dot chain line in FIG. 9(b)). The mechanism includes shafts 54a, 54b projecting from each arm portion; a guiding groove 56 provided to each sidewall portion 55 of the base member to be engaged with the shafts 54a, 54b; an urging spring 53 for urging the door member 52 toward the open position; and a locking device (not shown) for holding the door member 52 at the closed position. The guide groove 56 has a branch groove 56a on one side thereof. The branch groove 56a allows the shaft 54a to enter therein at a side slightly before a position Where the door member 52 is disposed at the closed position when the door member 52 is going to rotate around the shaft 54b as a supporting shaft. With this entering, the door member 52 makes its final rotation to be disposed on the final closed position. One end of the urging spring 53 is engaged with an engaging portion 57 at a side of the base member 51, and the other end thereof is engaged with the shaft 54a to provide a tensile force between the engaging portion 57 and the shaft 54a. The base member 51 includes a damper device 58 with a rotating shaft 58a incorporated into a sidewall portion 55. One end of an arm 59 is integrally and rotatably connected to the rotating shaft 58a. The other end of the arm 59 is linked to the shaft 54b.

In this mechanism, it is configured that the door member 52 is automatically opened by the urging spring 53 as much as possible when the locking device of the door member 52 in the closed position is released, as described in the following steps. At the beginning of the opening operation, the door member 52 is rotated in a direction toward the open position by the urging pressure of the urging spring 53 after the shaft 54a slips out of the branch groove 56a with the shaft 54b as a supporting point and is returned to the guiding groove 56 as shown in FIG. 9(b). In other words, the door member 52 is rotated around the shaft 54a within a section a shown in FIG. 9(a) where the shaft 54b does not move and only the shaft 54a moves. Then, the door member 52 is moved at a damped speed according to the rotation of the arm 59 of the damper device 58, and the opening portion of the base member 51 is fully opened, i.e. the door member 52 is shifted to the open position, when the shaft 54a reaches the terminal.

The opening-closing mechanism as shown in FIG. 8(a) is of a mono-axial type where the door member 42 is rotated around the pivot shaft 45 as a supporting point. Its operation is characterized such that the door member 42 projects upward higher than the base member 41 in a state that the door member 42 is shifted to the open position as shown by phantom lines, thereby enlarging a length h1 in FIG. 8(a). Therefore, as the opening-closing device, for example, when an article is put into or taken out of the base member 41, the article easily hits the projected portion of the door member 42, and its appearance also becomes poor. Incidentally, the problem can be solved by reduction of the length hi to a length h2, as shown in FIG. 8(b), by enlarging the arm portion 44 so that the pivot shaft 45 as a supporting point is lowered. However, in this case, the door member 42, shown by the phantom lines, disposed on the open position is greatly separated from the base member 41. At this time, a length t as shown in FIG. 8(b), i.e. a space when the door member 42 is disposed on the opened position, is required to be large. For example, there is a problem in a case that the base member 41 is to be disposed in a concave as an installation place, or in a case that the door member 42 is to be disposed inside the base member 41 and the door member 42 is placed at the opened position.

The opening-closing mechanism as shown in FIGS. 9(a), 9(b) has been developed in order to solve the above-described problems. However, the mechanism has problems from the following points of view. In the mechanism, the shafts 54a, 54b are made of metal for its rigidity and operational points. Moreover, the pair of the shafts 54a, 54b is provided on each side, thereby requiring total four shafts, resulting in poor assembling ability and a higher cost. From an operational point of view, while the shaft 54a is moving in the section a and the door member 52 is rotated in the direction of the open position, the damper device 58 does not act on the door member 52. The damping does not work effectively until the door member 52 is rotated as the shaft 54a is moving in a section b. Therefore, the door member 52 is rotated too quickly or slowly in the section a at the beginning in the direction of the open position, and is gently rotated in the section b by being damped as designed, so that the speed is changed stepwise and a continuous smooth movement can not be obtained.

In view of the above defects, the present invention has been made, and an object of the invention is to provide an opening-closing mechanism and an opening-closing device that solve all of the above problems. Specifically, when compared with the conventional mechanism as shown in FIGS. 8(a) and 8(b), the portion of the door member projected upward from the base member at the opened position is made smaller, and the door member is damped through an engagement of various gears. When compared with the conventional mechanism as shown in FIGS. 9(a) and 9(b), the operational characteristics and assembling ability can be improved.

Further objects and advantages of the invention will be apparent from the following description of the invention.

SUMMARY OF THE INVENTION

In order to attain the above objects, according to the first aspect of the invention, in an opening-closing mechanism of a door member for rotatably shifting from a closed position for closing an opening portion of a box-shape base member to an open position for opening the opening portion and vice versa, the door member includes supporting arm portions projected thereat; a circular arc shape gear portion provided to the arm portion; and a rotary gear disposed at a center of a circular arc of the circular arc shape gear portion. The box-shape base member includes the first fixed internal type gear portion to be engaged with the circular arc shape gear portion, and the second fixed gear portion disposed inside the first fixed gear to be engaged with the rotary gear. The arm portion is supported movably in a vertical direction through the engagement between the first fixed gear portion and the circular arc shape gear portion and between the second fixed gear portion and the rotary gear, so that the door member is shifted through the arm portions in a moving path corresponding to the first fixed gear portion.

In the above opening-closing mechanism, the arm portion includes the circular arc shape gear portion and the rotary gear disposed at the center of the gear portion, and the door member is assembled to be rotated and moved in the vertical direction through the engagements between the first fixed gear portion of the base member and the circular arc shape gear portion and between the second fixed gear portion of the base member and the rotary gear. More specifically, the first fixed gear portion has a circular arc shape corresponding to the circular arc shape gear portion, and is formed of teeth provided on an inner surface thereof, i.e. an internal gear type. The door member is moved with a moving path along the internal year portion of the first fixed gear portion through the arm portion. In other words, in the opening-closing mechanism, when the door member is rotatably shifted from the closed position to the open position and vice versa, the movement similar to those shown in FIGS. 9(a) and 9(b) can be obtained by moving the rotation supporting point of the door member downward or upward according to the internal year portion of the first fixed gear portion (and the gear portion of the second fixed gear portion). The advantages of the present invention are that, as opposed to the mechanism as shown in FIGS. 9(a) and 9(b), when the door member 3 is shifted from the closed position to the opened position and vice versa, a smooth movement can be securely obtained from the beginning to the end through the engagement between the gears.

Thus, the mechanism of the invention achieves a damped operation due to the engagement between the various gears without a damper device. In terms of a cost, since the shafts made of metal as shown in FIGS. 9(a) and 9(b) are not used, a cost can be reduced. This is because the circular arc shape gear portion can be integrally formed on a free end of the arm portion according to the second aspect of the invention, and the first fixed gear portion and the second fixed gear portion can be integrally formed on a side wall portion of the base member. In terms of the damping, a damper device may be used as the third aspect of the invention. That is, a damping force of an exclusive damper device can be easily applied in addition to the damping force obtained through the engagement between the various gears.

According to the fourth aspect of the invention, the mechanism as described above is considered as an opening-closing device. In the opening-closing device of the door member wherein the door member is rotatably shifted from the closed position for closing the opening portion of the box-shape base member to the open position for opening the opening portion, there are provided an urging device for urging the door member in the direction of the open position, a locking device for locking the door member at the closed position against the urging force of the urging device to be releasable, and a damper device for damping. The door member is shifted from the closed position to the open position and vice versa by the opening-closing mechanism according to the first aspect of the invention.

The above opening-closing device possesses advantages of the opening-closing mechanism as described above. In addition, the portion of the door member projecting from the base member can be made small in a state where the door member is disposed at the open position. Also, the door member can be easily housed in the base member. With respect to the operation, the movements of the door member, shifting from the closed position to the open position by the urging force of the urging device and shifting from the open position to the closed position against the urging force of the urging device, can be smoothly carried out by not only the damper device but also the engagements of the various gears.

Regarding the structure of the opening-closing device, according to the fifth aspect of the invention, the damper device may be a rotary type, so that in a case that the rotary gear of the opening-closing mechanism is mounted on an output shaft, its assembling property can be improved and the number of parts can be reduced. As a shape of the device, according to the sixth aspect of the invention, the sidewall portion of the base member includes a window portion with a box shape provided on a step portion and an end surface of the step portion communicating between an interior and an exterior. As each arm portion of the door member is projected to the exterior from the base member through the window portion, even in a type where the door member is housed in the base member at its open position, a mechanical portion to be disposed in the base member can be removed to thereby keep a good appearance. Also, in the base member, it can be relatively freely designed.

BRIEF DESCRIPTION OF THE DRAWINGS

FIGS. 2(a) to 2(c) are views showing a detail of a base member, wherein FIG. 2(a) is a front view thereof, FIG. 2(b) is an upper surface view thereof, and FIG. 2(c) is a side view thereof;

FIGS. 3(a) and 3(b) are views showing a detail of a door member, wherein FIG. 3(a) is a front view thereof, and FIG. 3(b) is a side view thereof;

DETAILED DESCRIPTION OF THE PREFERRED EMBODIMENT

Figure 1:
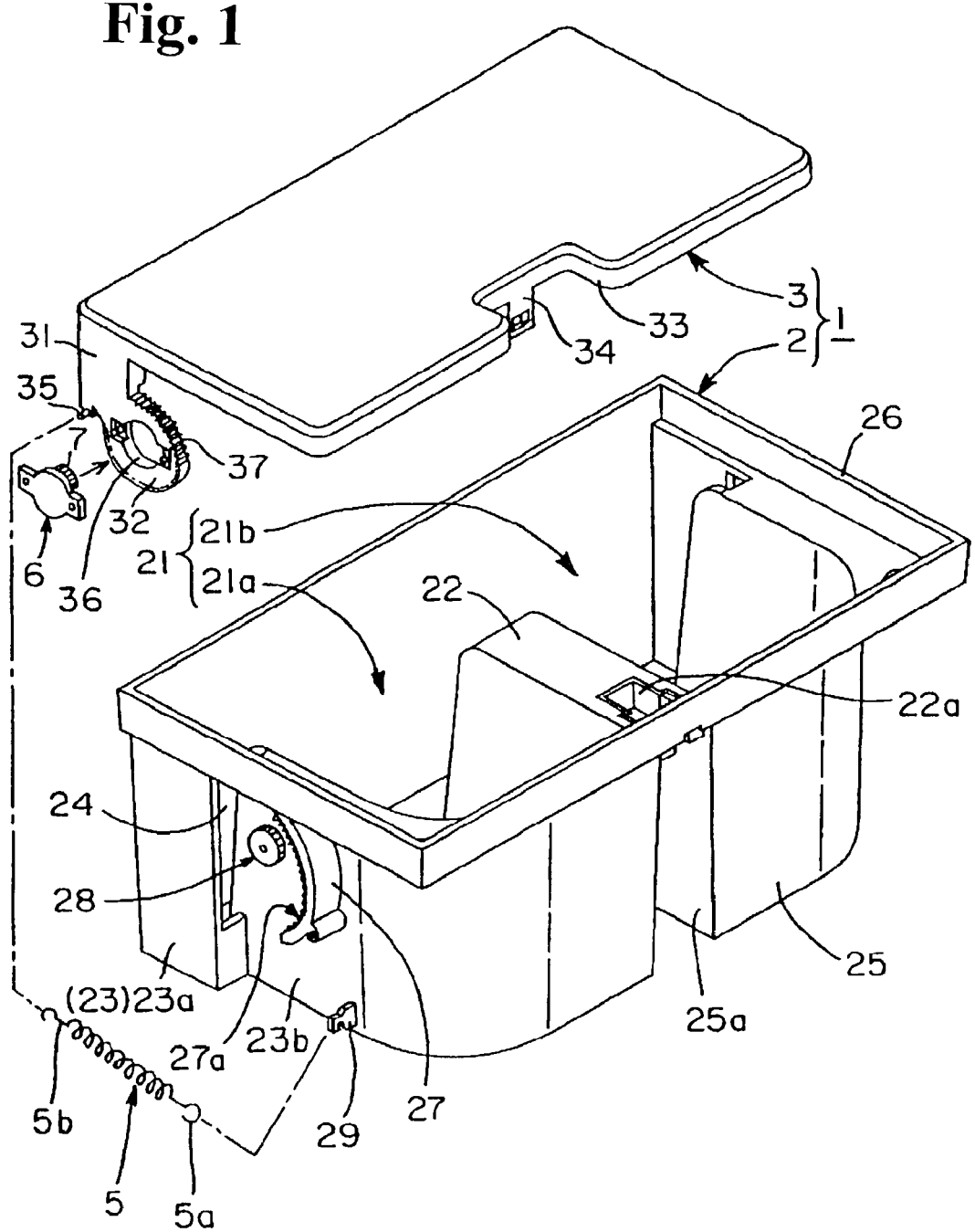
FIG. 1 is a schematic perspective view showing an opening-closing device to which an opening-closing mechanism of the invention is applied.
Figure 2A:
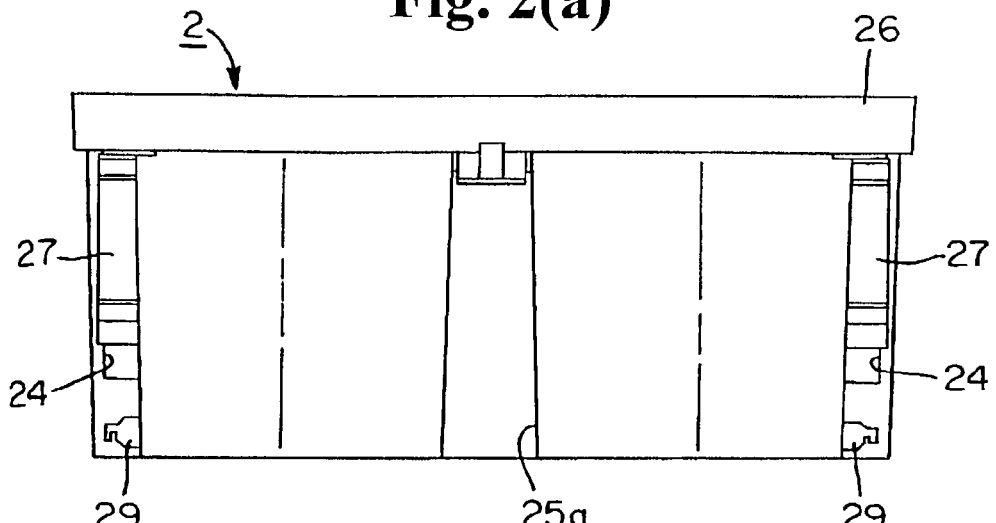
Figure 2B:
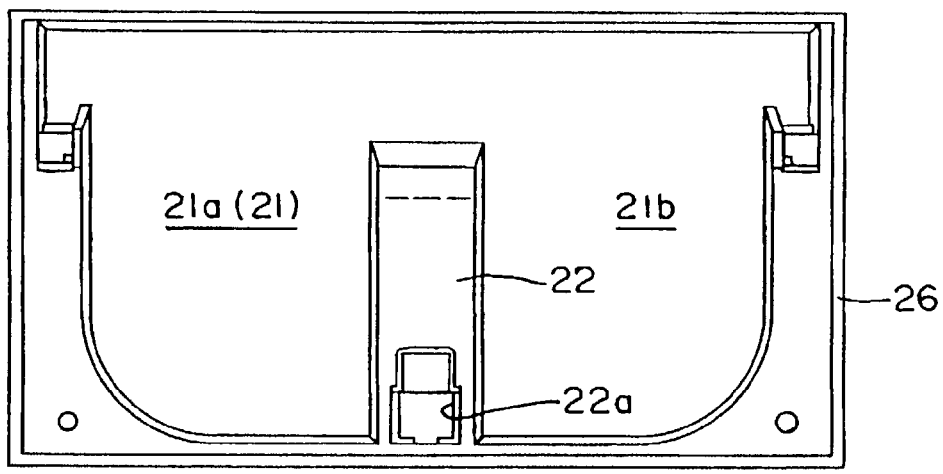
Figure 2C:
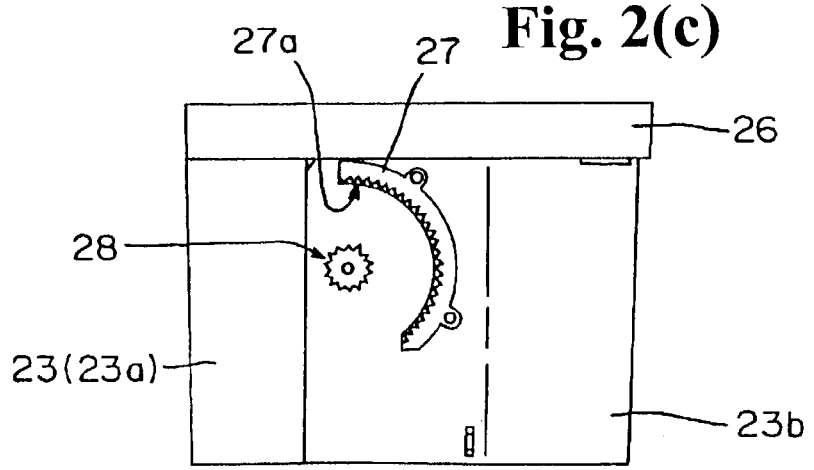
Figure 3A:
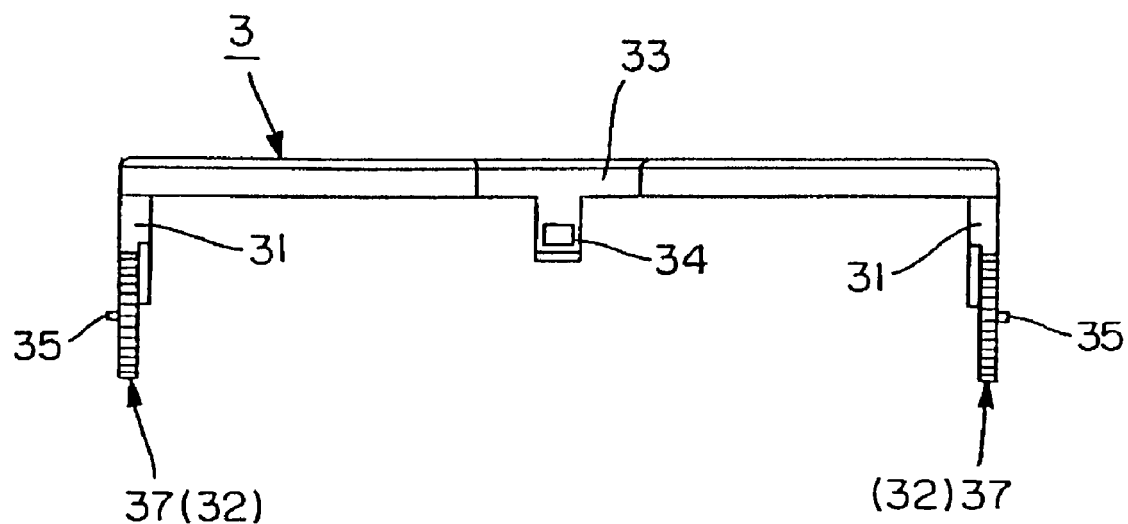
Figure 3B:
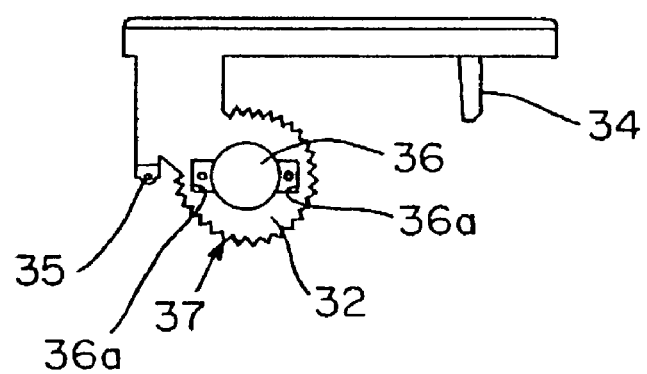
Figure 4:
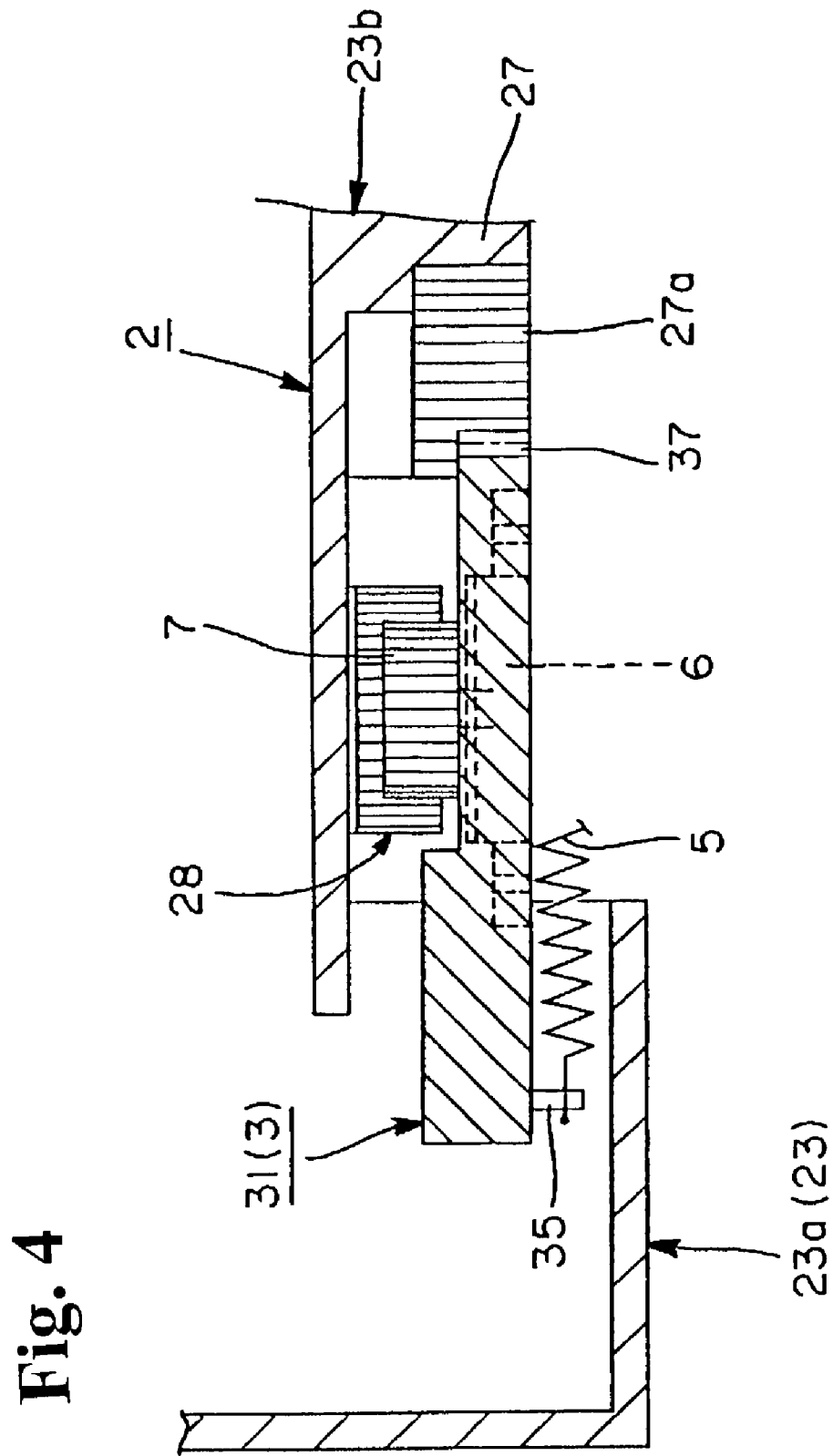
FIG. 4 is an enlarged schematic sectional view of an essential part taken along line 4–4 in FIG. 5(a) in a direction shown by arrows.
Figure 5A:
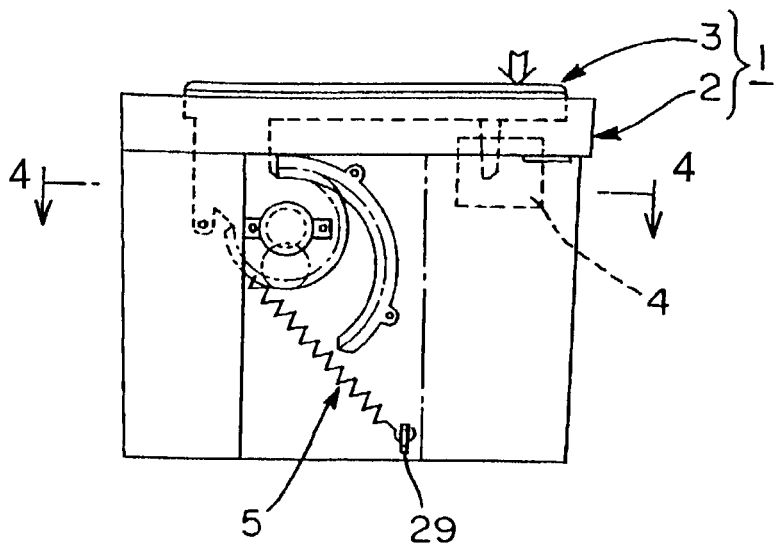
FIGS. 5(a) and 5(b) are schematic views showing a state where the door member is in a closed position.
Figure 5B:
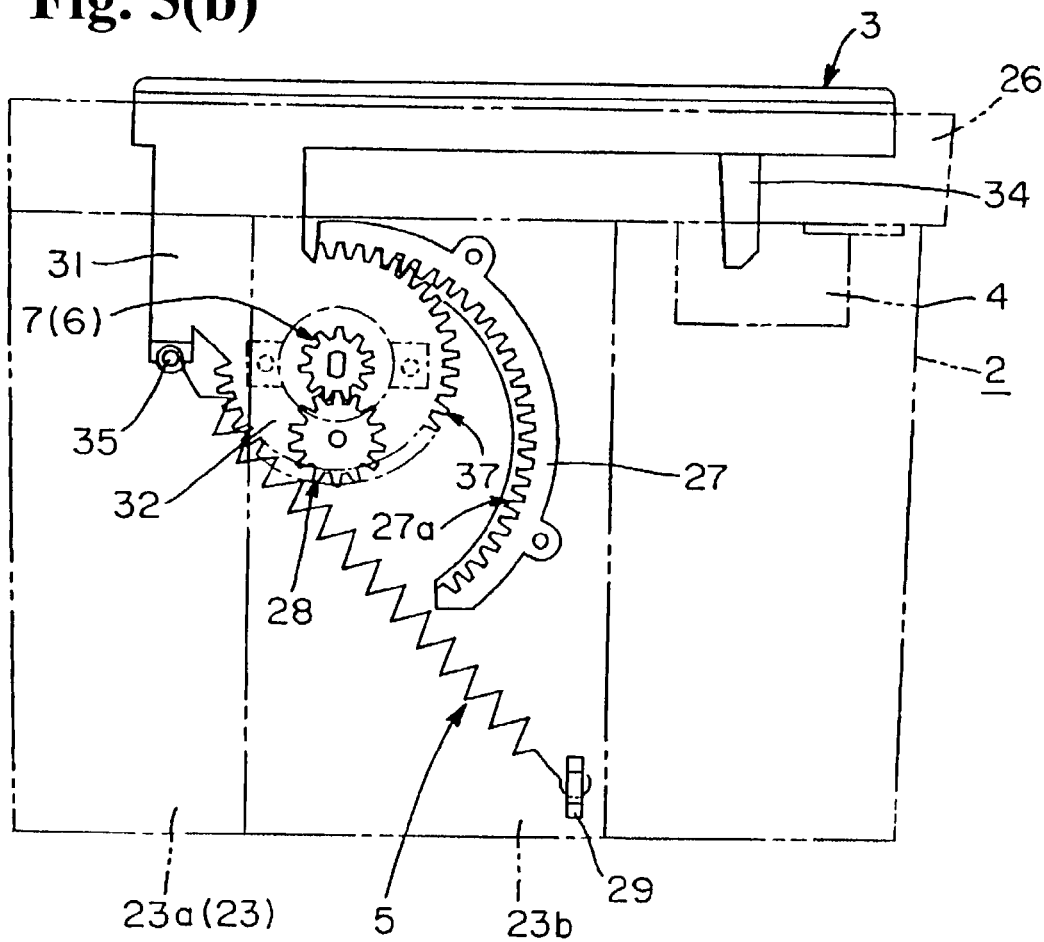
Figure 6:
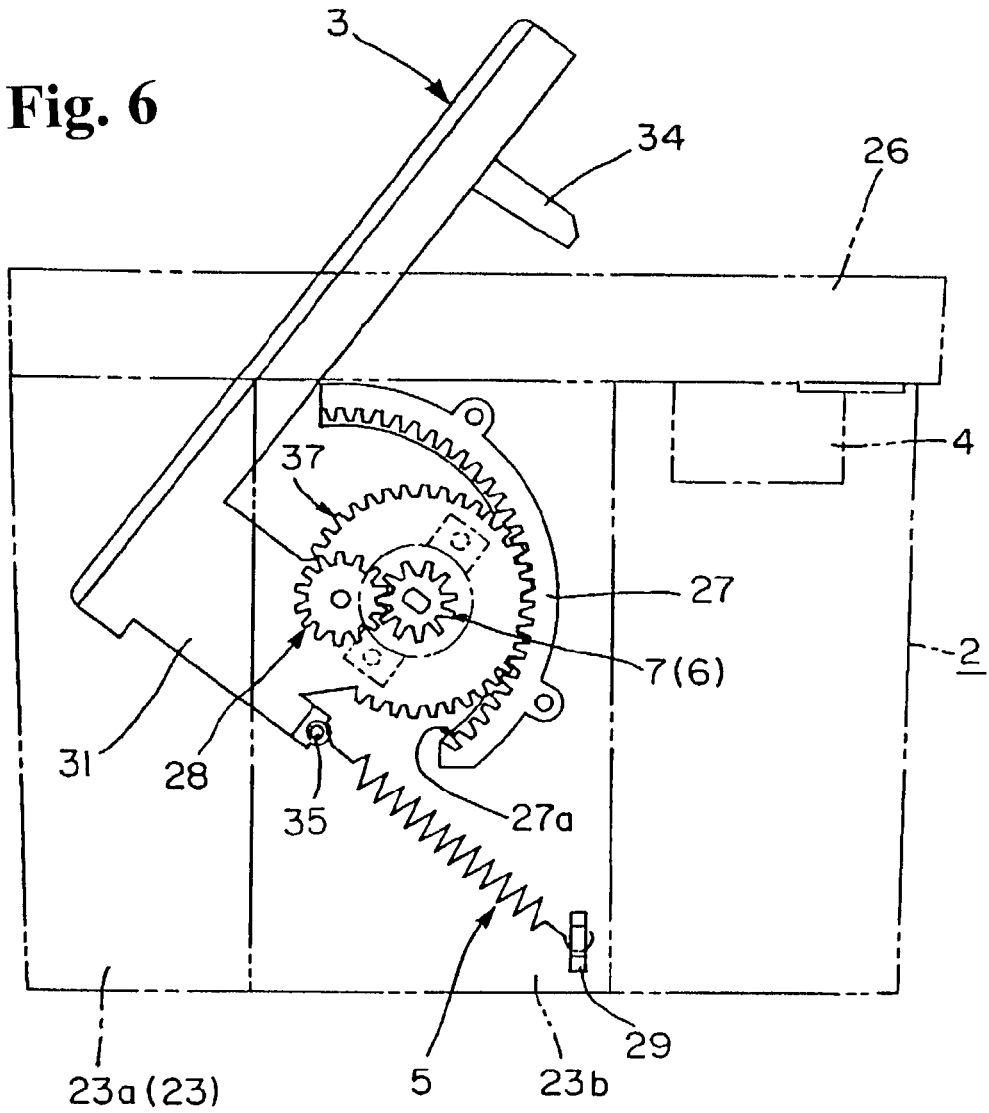
FIG. 6 is a schematic view showing a state where the door member is on a way to the open position from the closed position.
Figure 7:
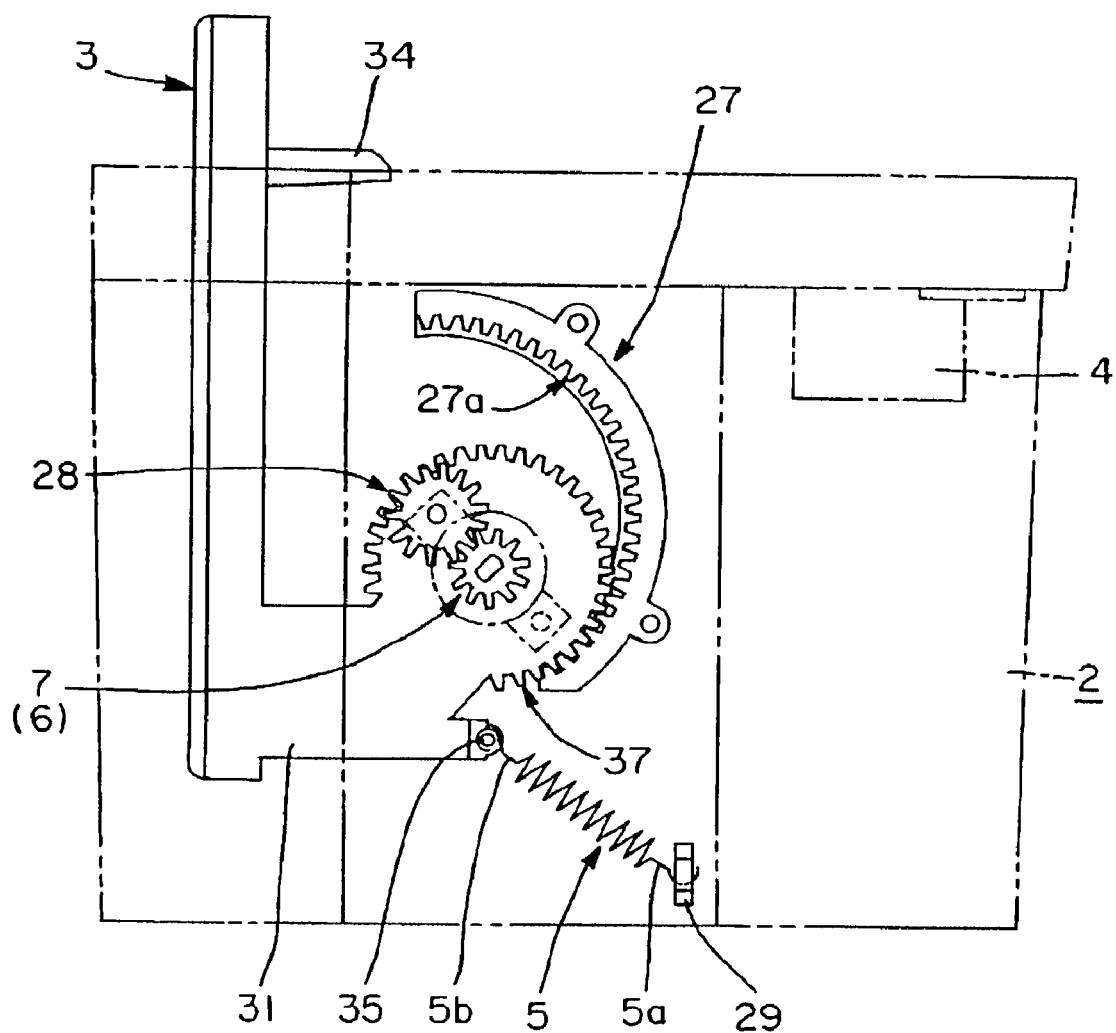
FIG. 7 is a schematic view showing a state where the door member is shifted to the open position.

Hereunder, an embodiment according to the present invention will be explained with reference to the accompanying drawings. FIG. 1 to FIG. 7 shows an example of a box (an opening-closing device), to which an opening-closing mechanism according to the present invention is applied. FIG. 1 is a perspective view showing a relationship between a door member and a box-shape base member. FIG. 2(a) is a front view, FIG. 2(b) is an upper surface view, and FIG. 2(c) is a side surface view of the base member. FIG. 3(a) is a front view and FIG. 3(b) is a side view of the door member. FIG. 4 is an enlarged schematic sectional view showing an essential part taken along line 4–4 seen from arrows in FIG. 5(a). FIG. 5(a) through FIG. 7 schematically shows operations of the closing-opening mechanism. In detail, FIG. 5(a) is a side view where the door member is located on a closed position; FIG. 5(b) is a schematic operational view thereof; FIG. 6 is a schematic operational view showing a state where the door member is on a way from the closed position to the open position; and FIG. 7 is a schematic operational view showing a state where the door member is shifted to the open position. First, a detailed description including an assembling of the opening-closing device, to which the opening-closing mechanism of the present invention is applied, will be given. Then, detailed operations of the opening-closing mechanism and the opening-closing device will be explained.

(Overall Summary) A box 1 of the present embodiment includes a box-shape base member 2 with an opening portion opened upwardly, and a door member 3, to which the present invention is applied, for closing the opening portion. The box 1 has been developed to be disposed in a concave portion of an instrument panel or a concave portion of a center console extending in the front and rear directions in the middle of a front side in a car compartment. However, as long as the opening-closing mechanism of the door member is a type where the door member is rotatably shifted from the open position to the closed position and vice versa, there is no restriction in its application field and using purposes.

As long as the base member 2 includes an opening portion corresponding to the door member 3, an interior and an appearance thereof may be variously modified according to a product to which the box 1 is applied. It is sufficient for the opening portion of the base member 2 to have an opening portion to be closed or opened through the rotational shift of the door member 3. Therefore, the door member 3 is not limited to the one wherein the door member 3 is disposed in the substantially horizontal direction in the closed position and in the substantially vertical direction in the open position, as in the present embodiment.

For example, as disclosed in Japanese Patent Application No. 2001-12455, front and rear sides of the base member 2 may be opened, and the door member 3 may be disposed in the substantially vertical direction at the closed position and in the substantially horizontal direction at the open position. In other words, the box 1 can achieve the object so long as the door member 3 is rotatably shifted from the closed position to the open position and vice versa with respect to the opening portion of the base member 2. The opening-closing mechanism of the door member 3 is a mechanism for rotatably shifting the door member 3 from the closed position to the open position and vice versa with respect to the opening portion of the base member 2. Preferably, the opening-closing mechanism includes a locking device 4 for holding the door member 3 at the closed position; an urging spring 5, such as a coil spring; and a damper device 6 for damping. Incidentally, both the base member 2 and the door member 3 are molded resin products by an injection molding.

(Box-Shape Base Member) The base member 2 of the present embodiment has a container shape with an upward opening. An interior 21 of the base member 2 is partitioned into concave portions 21a and 21b by a partition wall 22 disposed at the middle point in the left and right directions and extending up to a middle point from a front side in the front and rear directions. Each sidewall 23 has a step portion where a front wall 23b is located inside the interior 21 relative to a rear wall 23a. The step portion has a vertical narrow window 24 at the end surface thereof. A front wall 25 has a space portion 25a corresponding to the partition wall 22. An upper periphery of the box-shape base member 2 is provided with flange portions 26 projecting at a front side and both sides so that the door member 3 can be received thereon at the closed position. Therefore, the interior 21 is communicated at rear sides of the concaves 21a and 21b, and the door member 3 can be received in the communicated portion in a state where the door member 3 stands up, i.e. is opened.

Also, at the closed position for closing the opening portion of the base member 2, even if the door member 3 has a slight space with respect to the upper surface formed between the front wall 23b and the flange portion 26 and at the upper surface of the partition wall 22 and the inner side of the side wall 23, for example in relation to the locking device 4 (described later), the space is invisible by the flange 26. Incidentally, the box 1 is a housing box used also as a holder for holding a container, such as a beverage bottle, in the concave portions 21a, 21b of the base member 2. The box 1 is attached into a concave portion provided in an installation portion in a state that a portion lower than the flange 26 is inserted into the concave portion.

On each of the front walls 23b constituting both sidewalls 23 relative to the window 24, there are integrally formed the first internal type fixed gear portion 27a having a circular arc shape; the second fixed gear portion 28 located inside the circular arc of the first fixed gear portion 27a; and an engaging projection 29 positioned at a front lower side. Among them, the first fixed gear portion 27a is composed of a part of the internal gear teeth. In this example, the first fixed gear portion 27a is disposed to be closer to the front side than the second fixed gear portion 28, and has an arch-shape rib 27 projecting from the front wall 23b with an inner side facing the window 24 (with a convex portion toward the front side and positioned vertically). An inner surface portion of the rib 27 is provided with continuous gear teeth. On the other hand, the second fixed gear portion 28 has a spur gear structure wherein continuous gear teeth are formed along an outer periphery of a circular cylinder, and the center thereof substantially corresponds to the center of the circular arc of the first fixed gear portion 27a. The engaging projection 29 is a portion engaging one end 5a of the urging spring 5, and a key-shape end thereof is engaged with the one end 5a.

The partition wall 22 is provided with a concave portion 22a on the front side thereof, and a locking device 4 is incorporated in the concave portion 22a. The locking device 4 may have, for example, a latch device disclosed in Japanese Utility Model Publication No. 05-65587 or a push/push engaging mechanism similar to those disclosed in Japanese Patent Application No. 2000-12455. That is, when the door member 3 is rotated while pushing it toward the closed position with a hand, the door member 3 is engaged with the locking device 4, and when the door member 3 is further pushed to the same direction and is released, the door member 3 is released from the engagement. As a specific example, the locking device includes a housing with open upper and lower surfaces; a slider received at a lower side of the housing and having a pair of engaging pieces to engage and release an engagement member 34 of the door member 3 (described later); a spring (not shown) for urging the slider toward one direction; a hart cam groove provided in the slider; a tracer supported by a shaft in the housing; and a pin projecting from the tracer and engaging the hart cam groove to make a round trip along the hart cam groove by sliding of the slider.

The engagement member 34 abuts against the slider through the rotating operation of the door member 3 toward its closed position, and the slider is slid under the housing against the urging force of the spring. Along with this, the engaging pieces are engaged with holes of the engagement member 34 while being brought into the housing, or pinch the projection of the engagement member 34. At the same time, since the engaging pieces are engaged at their retreated position through the engagement between the pin and the hart cam groove, the slider is engaged to hold the door member 3 at the closed position. In order to release the engagement, when the door member 3 located at the closed position is further pushed in the door closing direction, the engagement between the pin and hart cam groove is released through the movement of the slider. At the same time, the slider is pushed by the urging force of the spring to thereby project the engaging pieces outside the housing. As a result, the engagement member 34 of the door member 3 is released from the engaging pieces, and the engagement is released. The engaging mechanism as described above is excellent in its operational ability and appearance. Of course, the locking device 4 may have a structure other than this.

(Door Member) The door member 3 is a flat plate with a size enough for covering the opening portion of the base member 2. The door member 3 includes supporting arm portions 31 projecting from both rear sides thereof; a free end 32 of a substantially circular arc shape provided to an end of each supporting arm portion 31; a recess portion 33 with a cut at a center portion in the left and right directions disposed at a front side of the door member 3; and the engagement member 34 projecting downward from the deep inside wall of the recess portion 33. The free end 32 projects from the lower front side of each arm portion 31, and the upper side of the arm portion 31 is formed slightly thicker and the side of the free end 32 thereof is made slightly thinner. Also, the free end 32 of the arm portion 31 can project through the window portion 24 with a sufficient space, i.e. extends toward the front wall side 23b of the sidewall portion 23. The arm portion 31 is provided with a shaft portion 35 on a lower side thereof to which the other end 5b of the urging spring 5 is hooked. The free end 32 is assembled with a damper device 6 at a substantially central portion thereof, and also is integrally provided with a circular arc gear portion 37 on an outer periphery thereof.

That is, the circular arc shape gear portion 37 is a concentric gear with the circular arc of the free end 32, and is engaged with the first fixed gear portion 27a. At the same time, the circular arc shape gear portion 37 can move upward and downward along the internal teeth of the first fixed gear portion 27a in a process where the door member 3 is rotated from the closed position to the open position or from the open position to the closed position. The center portion of the free end 32 is provided with an attachment through-hole 36. A pair of fixed level differences 36a is formed on an outer surface side outside the attachment through-hole 36. The damper device 6 is assembled into the attachment through-hole 36 by positioning engagement portions integrally formed with a main portion in the fixed level differences 36a in a state where the main portion is inserted into the attachment through-hole 36 to be held therein. The damper device 6 may be formed of a rotary-type oil damper, which is well known, or the like, and includes a rotary gear 7 mounted on an output shaft that receives resistance of the operation oil. The rotary gear 7 is inserted into the attachment through-hole 36 to engage the teeth of the second fixed gear portion 28.

The door member 3 as described above, for example, is assembled in the base member 2 by the following manner: First, the urging spring 5 is attached to the arm portion 31 by allowing the other end 5b thereof to engage the shaft portion 35. Next, both arm portions 31 are inserted into the corresponding window portions 24, and the free ends 32 are pushed between the first fixed gear portion 27a and the second fixed gear portion 28, respectively, so that each circular arc shape gear portion 37 engages the first fixed gear portion 27a and each rotation gear 7 engages the second fixed gear portion 28 to thereby assemble the door member 3 to the base member 2. Thus, the door member 3 is rotatably supported by the base member 2 through the engagements of the respective gear portions.

Figure 9A:
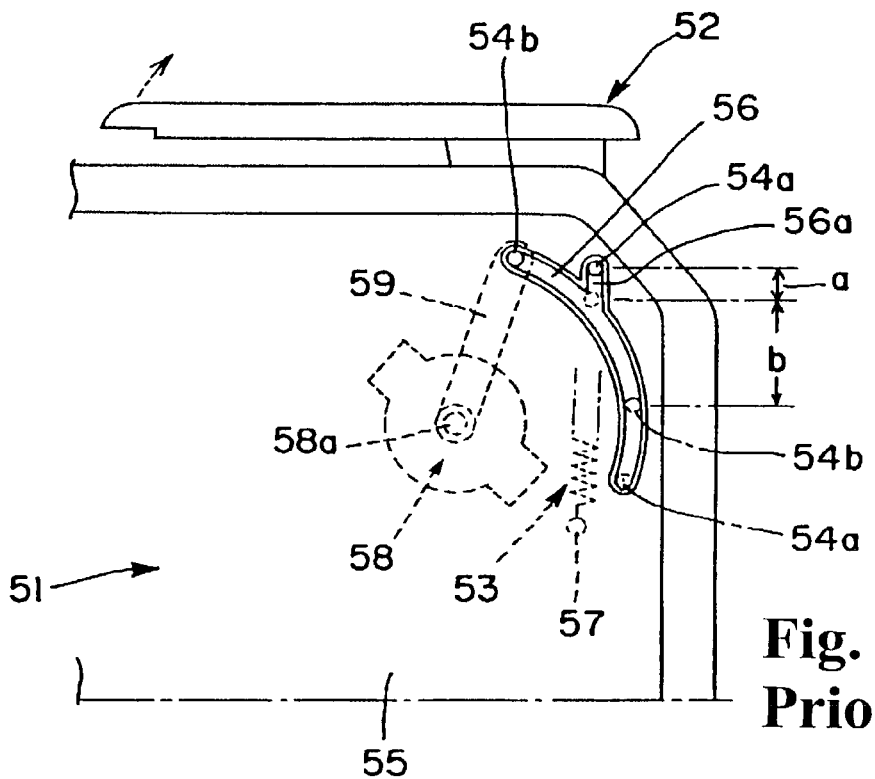
FIGS. 9(a) and 9(b) are side views showing an opening-closing device to which a conventional opening-closing mechanism is applied.
Figure 9B:
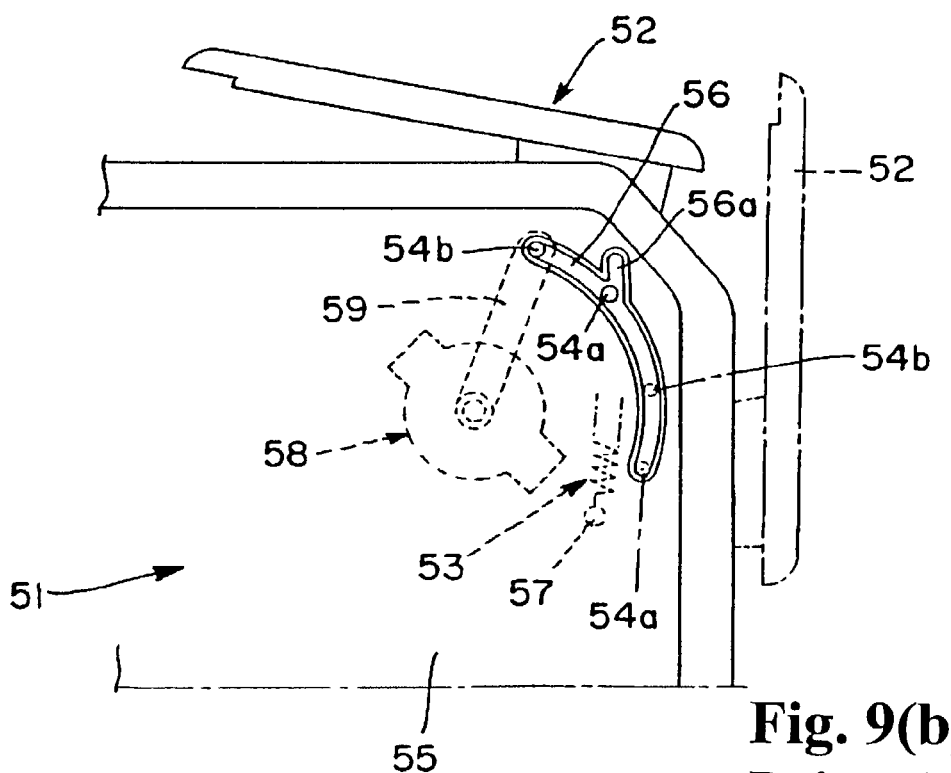

Thereafter, one end 5a of the urging spring 5 is hooked to the engaging projection 29 while pulling it so that an urging force is applied to the door member 3 in the direction of the open position to thereby shift the door member 3 to the open position. Therefore, according to the structure of the invention, the members except the base member 2 and the door member 3 are only the urging spring 5 and the damper device 6. Thus, the number of the members and assembling processes can be reduced as compared with the prior art as shown in FIG. 9. Incidentally, in the opening-closing mechanism according to the invention, the damper device 6 may be omitted. In this case, for example, a rotary gear similar to the rotary gear 7 is rotatably provided at the center portion of the free end 32.

(Operation) Next, opening and closing operations of the door member 3 as described above will be explained in detail with reference to FIG. 5(a) through FIG. 7. FIGS. 5(a) and 5(b) show a state where the door member 3 completely closes the opening portion of the base member 2. In the closed position, as shown in FIG. 5(b), the door member 3 is fixed in the position against the urging force of the urging spring 5 by the locking device 4. The circular arc shape gear portion 37 engages the teeth on the upper side among the internal teeth of the first fixed gear portion 27a, and the rotary gear 7 engages the teeth on the upper side of the outer periphery of the second fixed gear portion 28. Under the state, since the door member 3 is held by the engagement between the respective gear portions, even if a large vibration is applied, no wobbling takes place. When the door member 3 is shifted to the open position, the front side of the door member 3 is pressed in the arrow direction in FIG. 5(*a*), i.e. a lower side, which is a direction of further closing the door member 3 from the closed position of the door member 3, i.e. a pressing operation in the closing direction, and then is released. Then, after the door member 3 is released from the locking device 4, the door member 3 is rotated in the direction of the open position by the urging force of the spring 5.

FIG. 6 shows a state where the locking device 4 is released, and then the door member 3 starts moving in the direction of the open position. At this time, the circular arc shape gear portion 37 is moving from the upper side teeth to the lower side teeth while engaging the internal teeth of the first fixed gear portion 27*a*. At the same time, the rotary gear 7 is rotated along the outer periphery of the second fixed gear portion 28 while engaging the teeth on the outer periphery of the second fixed gear portion 28. In other words, the rotary gear 7 is interlocked with the circular arc shape gear portion 37 to move downward from the teeth on the upper side to the teeth on the lower side.

In this structure, the circular arc shape gear 37 is rotated along a path of the internal teeth of the first fixed gear portion 27*a*, and the rotary gear 7 makes a movement similar to a planetary movement with the second fixed gear portion 28 as a center, so that the door member 3 is shifted toward the open position while rotatably moving downward. In this shift of the door member 3, the speed is reduced through the engagement between the respective gears and damped by the damper 6. Therefore, the door member 3 is moved at a substantially constant speed from the closed position shown in FIGS. 5(*a*) and 5(*b*) to the open position shown in FIG. 7. In the open position shown in FIG. 7, a portion projecting from the base member 2 is made small through the downward movement of the door member 3, so that the appearance can also be improved.

In a case that the door member 3 is again returned to the closed position, the projected portion of the door member 3 is pulled against the urging force of the urging spring 5. Then, at this time, in contrast with the explanation mentioned above, the circular arc shape gear portion 37 moves upward from the teeth on the lower side to the teeth on the upper side while engaging the internal teeth of the first fixed gear portion 27*a*. At the same time, the rotary gear 7 rotates around the second fixed gear portion 28 while engaging the teeth on the outer periphery of the second fixed gear portion 28, i.e. moves upward from the teeth on the lower side to the teeth on the upper side through cooperating with the circular arc shape gear portion 37. Also, immediate before the door member 3 reaches at the closed position, the engagement member 34 is engaged with the locking device 4, as described before, through the pushing operation. Incidentally, in the structure, when the door member is moved to the closed position, the speed is reduced through the engagement between the respective gears and the damping of the damper device 6. Thus, the door member 3 is moved at a substantially constant speed. However, as the damper device 6, in a case that a damper device having one operational direction structure is used, the damping force can be applied only when the door member is opened. In that case, when the door member is rotated from the open position to the closed position, the speed is reduced through only the engagement between the respective gears to thereby obtain a stable movement.

Figure 8A:
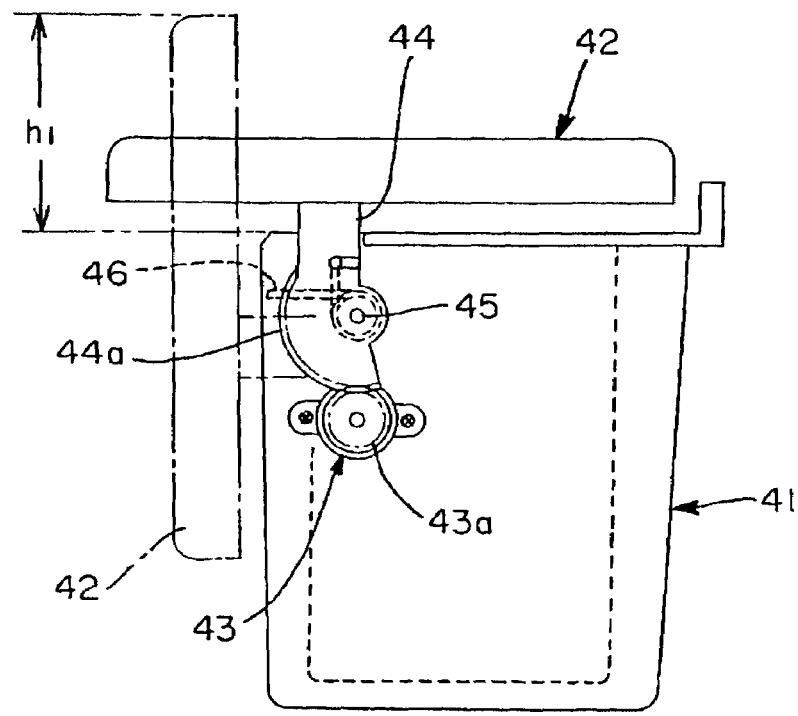
FIGS. 8(a) and 8(b) are side views showing an opening-closing device to which a conventional opening-closing mechanism is applied.
Figure 8B:
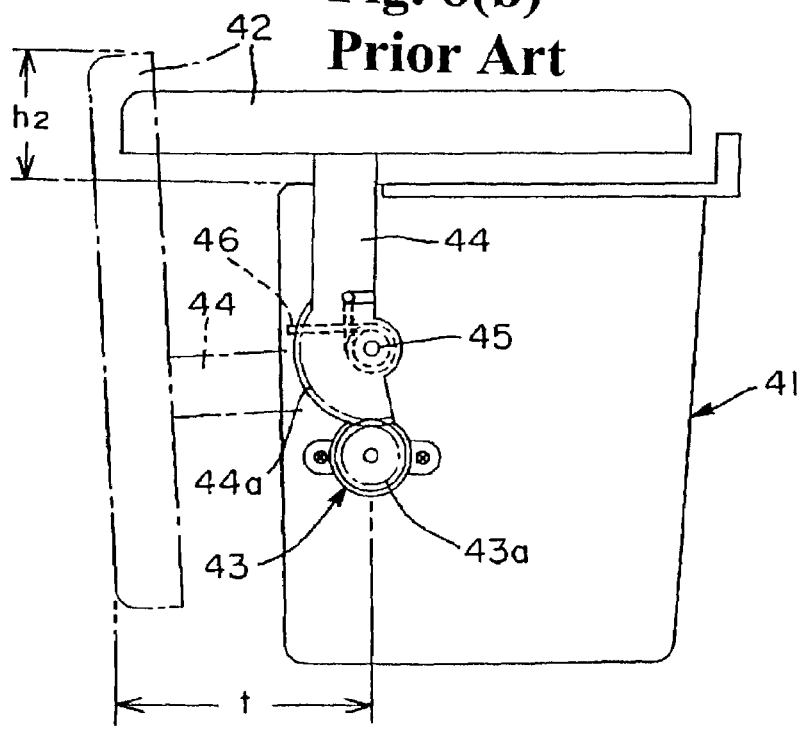

As described above, the opening-closing mechanism of the door member according to the present invention can attain the same movement as that of the prior art shown in FIGS. 9(*a*), 9(*b*) that has a vertical movement when the door member is rotatably shifted as opposed to the prior art as shown in FIGS. 8(*a*), 8(*b*). At the same time, contrary to the prior art shown in FIGS. 9(*a*), 9(*b*), when the door member is shifted, a continuous smooth movement can be attained through the engagement between the respective gears. Therefore, even if the damper device is not used, the opening-closing mechanism of the present invention provides the damping operation through the engagement between the respective gears. The opening-closing device according to the invention has such an advantage, with respect to the prior art shown in FIGS. 8(*a*), 8(*b*), that the portions projecting from the base member can be made small when the door member is in the open position. Also, the present opening-closing device has such an advantage, with respect to the prior art shown in FIGS. 9(*a*), 9(*b*), that the door member can be damped through the engagement between the respective gears, and the damper device can be easily provided. When compared with the prior art shown in FIGS. 9(*a*), 9(*b*), the operational characteristics of the present opening-closing device can be extremely improved, the assembling thereof is excellent, and the cost thereof can be reduced.

While the invention has been explained with reference to the specific embodiments of the invention, the explanation is illustrative and the invention is limited only by the appended claims.

What is claimed is:

1. An opening-closing mechanism for rotating a door member between a closed position for closing an opening portion of a box-shape base member and an open position for opening the opening portion, comprising:
    a first fixed internal gear portion to be disposed on the box-shape base member,
    a second fixed gear portion to be disposed on the box-shape base member and located inside the first fixed internal gear portion, and
    a pair of arm portions to be fixed to the door member, one of said arm portions having a circular arc shape gear portion engaging the first fixed internal gear portion, and a rotary gear disposed at a center of the circular arc shape gear portion and engaging the second fixed gear portion, said one of the arm portions being supported to be vertically movable through the engagements between the first fixed internal gear portion and the circular arc gear portion and between the second fixed gear portion and the rotary gear to allow the door member to be moved through the one of the arm portions along a path corresponding to the first fixed internal gear portion.

2. An opening-closing mechanism according to claim 1, wherein said circular arc shape gear portion is integrally formed at a free end of the arm portion, and said first fixed internal gear portion and said second fixed gear portion are adapted to be integrally formed on a sidewall portion of the base member.

3. An opening-closing mechanism according to claim 1, further comprising a damper device attached between the arm portion and the rotary gear.

4. An opening-closing mechanism according to claim 1, wherein said rotary gear is always located between the first fixed internal gear portion and the second fixed gear portion so that the arm portion is moved vertically based on a location of the rotary gear.

5. An opening-closing device having said opening-closing mechanism according to claim 1, comprising:
   an urging device for urging the door member toward the open position,
   a locking device for locking the door member at the closed position against the urging device, and
   a damper device for damping the door member.

6. An opening-closing device according to claim 5, wherein said damper device is a rotary type damper, and said rotary gear in the opening-closing mechanism is mounted on an output shaft of the rotary type damper.

7. An opening-closing device according to claim 5, wherein said base member includes sidewall portions, and step portions at the sidewall portions, each of said step portions having a window portion communicating between an interior and an exterior, said arm portion of the door member extending through the window portion.

8. A box with an opening-closing mechanism, comprising:
   a box-shaped base member having an opening portion and sidewalls, and a door member rotatably attached to the box-shaped base member to move between a closed position for closing the opening portion and an open position for opening the opening portion,
   a first fixed internal gear portion disposed on one of the sidewalls of the box-shape base member,
   a second fixed gear portion disposed on the sidewall inside the first fixed internal gear portion, and
   a pair of arm portions fixed to the door member, one of said arm portions having a circular arc shape gear portion engaging the first fixed internal gear portion, and a rotary gear disposed at a center of the circular arc shape gear portion and engaging the second fixed gear portion, said one of the arm portions being supported to be vertically movable through the engagements between the first fixed internal gear portion and the circular arc gear portion and between the second fixed gear portion and the rotary gear to allow the door member to be moved through the pair of the arm portions along a path corresponding to the first fixed internal gear portion.

9. A box according to claim 8, further comprising an urging device for urging the door member toward the open position, a locking device attached to the base member and the door member for locking the door member at the closed position against the urging device, and a damper device disposed between the base member and the door member for damping the door member.

10. A box according to claim 9, wherein said rotary gear is always located between the first fixed internal gear portion and the second fixed gear portion so that the arm is moved vertically based on a location of the rotary gear.

11. An opening-closing mechanism according to claim 1, wherein said first fixed internal gear portion and said second fixed gear portion are disposed on each side of the base member, and each of the arm portions includes the circular arc shape gear portion and the rotary gear, said circular arc shape gear portion and said rotary gear in each of the arm portions engaging the first fixed internal gear portion and the second fixed gear portion on each side of the base portion.

12. A box according to claim 8, wherein said first fixed internal gear portion and said second fixed gear portion are disposed on each side of the base member, and each of the arm portions includes the circular arc shape gear portion and the rotary gear, said circular arc shape gear portion and said rotary gear in each of the arm portions engaging the first fixed internal gear portion and the second fixed gear portion on each side of the base portion.

* * * * *